G. A. ROSSITER.
GYROSCOPIC COMPASS.
APPLICATION FILED FEB. 8, 1919.

1,425,056.

Patented Aug. 8, 1922.
3 SHEETS—SHEET 1.

Inventor
G. A. Rossiter, by
*Witherspoon*
Attorney

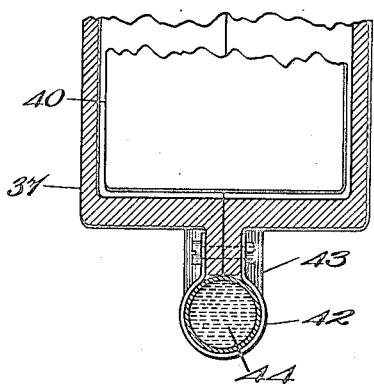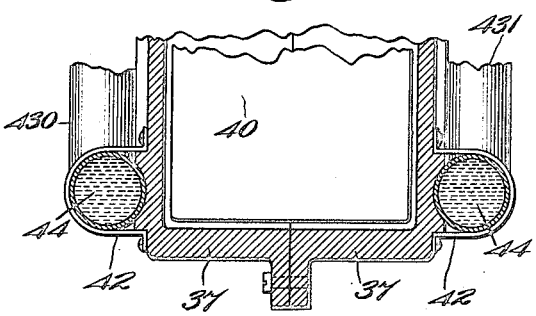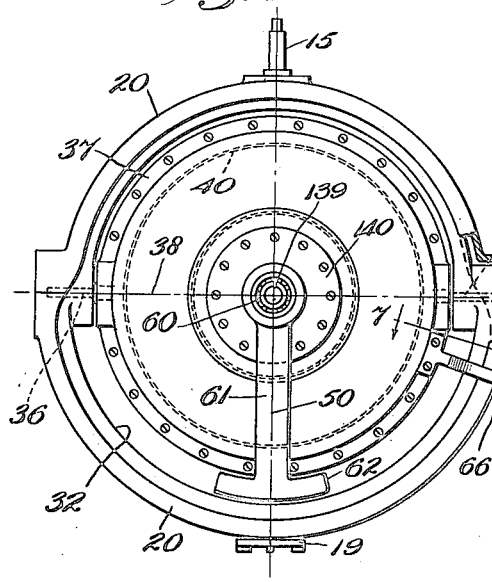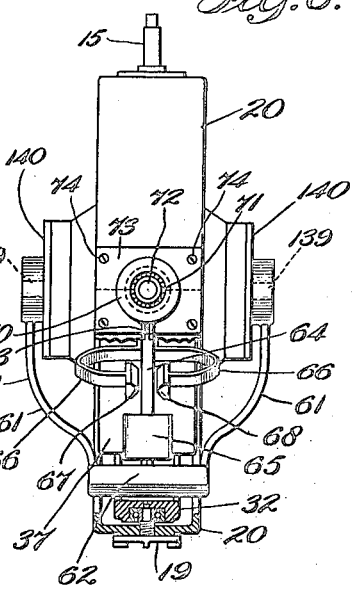

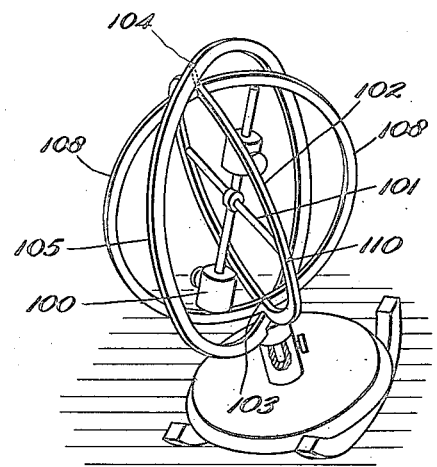
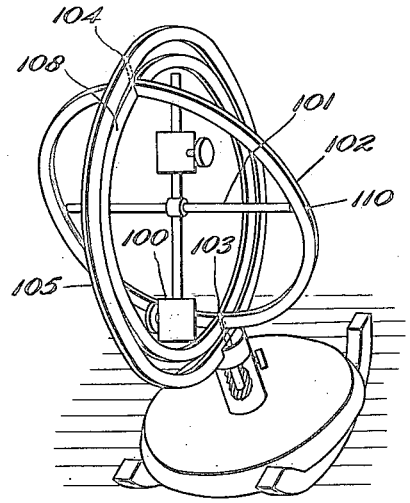
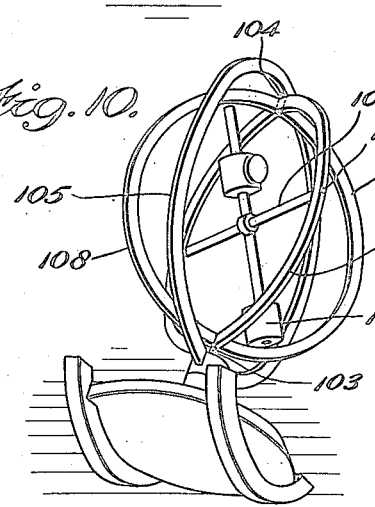
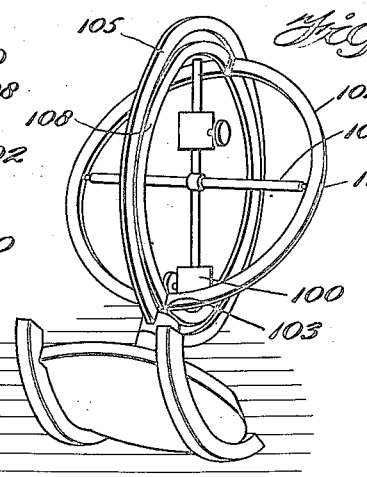
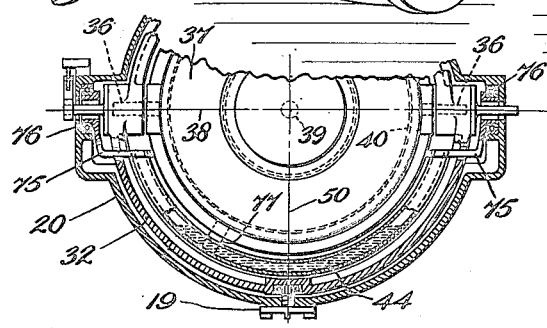

UNITED STATES PATENT OFFICE.

GEORGE A. ROSSITER, OF BROOKLYN, NEW YORK, ASSIGNOR TO THE CARRIE GYRO-SCOPIC CORPORATION, OF NEW YORK, N. Y., A CORPORATION OF NEW YORK.

GYROSCOPIC COMPASS.

1,425,056.         Specification of Letters Patent.         Patented Aug. 8, 1922.

Application filed February 8, 1919. Serial No. 275,905.

*To all whom it may concern:*

Be it known that I, GEORGE A. ROSSITER, a citizen of the United States, residing at Brooklyn, in the county of Kings and State of New York, have invented certain new and useful Improvements in Gyroscopic Compasses; and I do hereby declare the following to be full, clear, and exact description of the invention, such as will enable others skilled in the art to which it appertains to make and use the same.

This invention relates to gyroscopic compasses and has for one of its objects to provide a construction which will be more simple in construction and more efficient in action than those heretofore proposed.

With this and other objects in view the invention consists in the novel details of construction and combinations of parts more fully hereinafter disclosed and particularly pointed out in the claims.

Referring to the accompanying drawings forming a part of this specification in which like numerals designate like parts in all the views:—

Figure 3 is an enlarged sectional detail view taken on the line 3—3 of Figure 1;

Figure 4 is a view similar to Figure 3, of a slightly modified form of the invention;

Figure 5 is a side elevational view partly in section of a still further modified form of the invention;

Figure 6 is an edge elevational view partly in section of the parts shown in Figure 5;

Figure 7 is an enlarged sectional view taken on the line 7—7 of Figure 5;

Figures 8, 9, 10 and 11 are diagrammatic views showing how errors in prior compasses may be produced by the rolling and pitching movements of the ship; and Figure 12 is a fragmentary sectional elevational view of a still further modified form of the invention.

1 indicates the binnacle casing, 2 the outer Cardan ring, 3 the inner Cardan ring, 4 and 5 the pivots joining said rings, and 6 the main frame of the compass proper.

Figure 1:
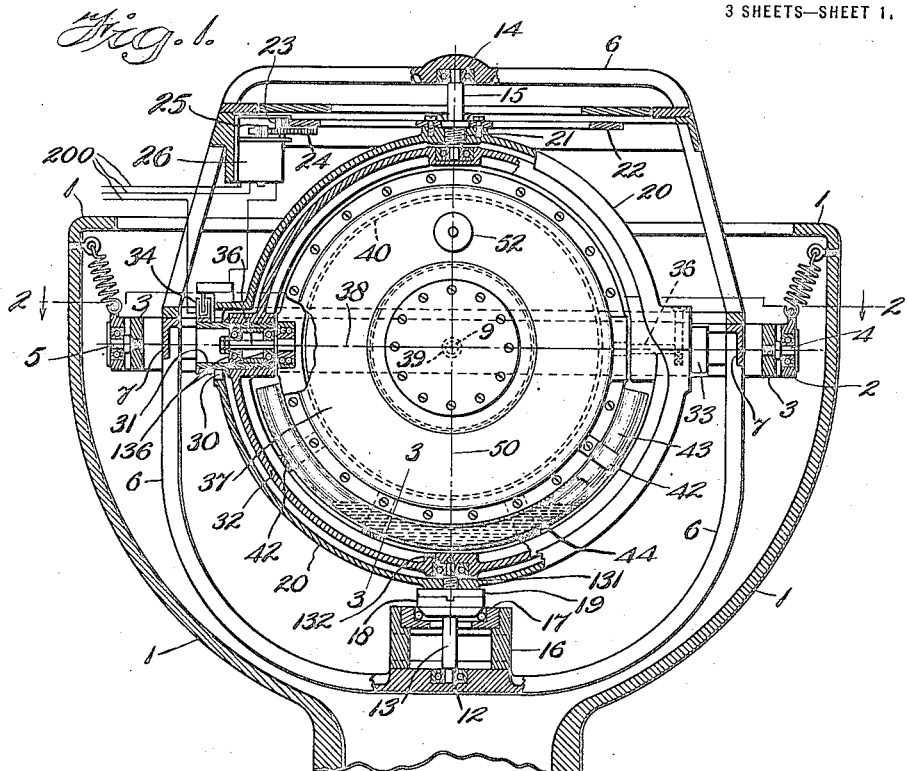
Figure 1 is a vertical sectional view of a compass made in accordance with this invention.
Figure 2:
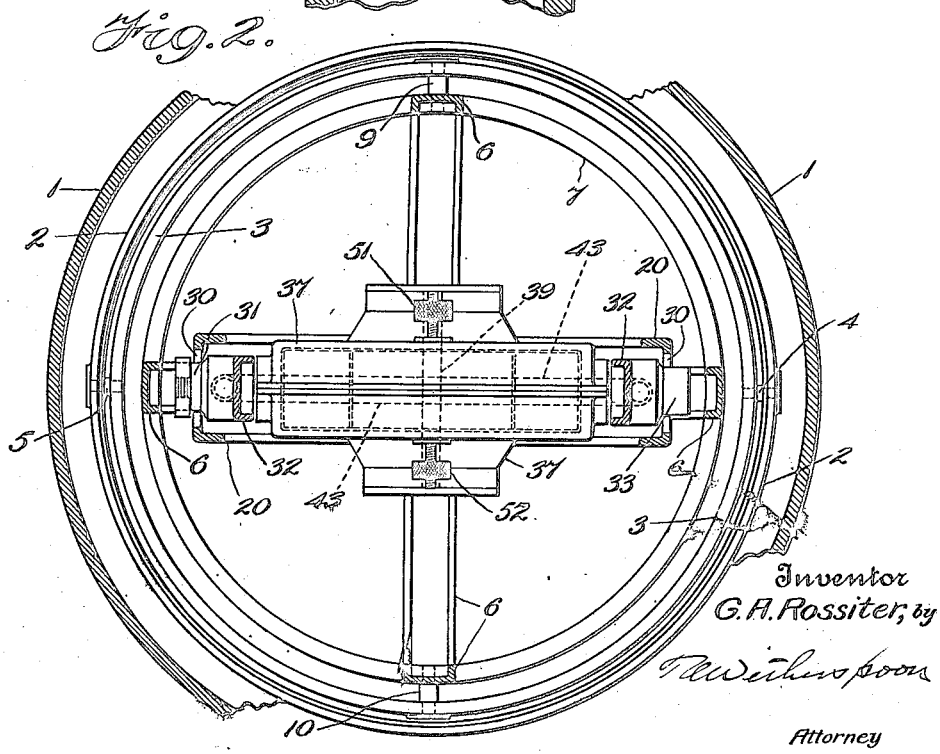
Figure 2 is a view taken on the line 2—2 of Figure 1, looking in the direction of the arrows.

Said frame 6 is provided with a horizontally disposed ring 7 which is supported from the ring 3 by the pivots 9 and 10, located 90 degrees from the pivots 4 and 5 as best shown in Figure 2. The said frame 6 at its lowest portion carries the ball bearing 12, associated with the vertical pivot 13, and at its highest portion said frame 6 carries the ball bearing 14 associated with the vertical pivot 15, all as will be clear from Figure 1.

Surrounding said pivot 13 is the vertically disposed pillow block 16 in which steps the outer ring 17 of a ball bearing, the inner member 18 of which is rigid with the vertical pivot 13, and is provided with a detachable member 19 on which fits the shadow or follow up ring 20 as shown. Rigid with said member 19 is the vertical pivot 131 which screw threads into the shadow ring, and terminates in the ball bearing 132 carried by the vertical supporting ring 32. Also rigid with said pivot 15, and shadow ring 20 at its top portion is the azimuth ring or gear 22 meshing with the pinion 23 rigid with the gear 24, meshing with the pinion 25, rigid with the shaft of the follow up motor 26 as shown. Said shadow ring 20 is provided with the usual diametrically disposed openings, only one of which 30 is shown in Figure 1, and through this latter projects one of the trunnion sleeves 31 of said vertical ring 32. Said trunnion sleeve 31 is provided with the well known contact members 34 which may be joined to the motor 20 by the wire connections 200 in a manner also well known. The said trunnion sleeve 31 also receives one of the horizontal pivots 36 of the casing 37 which is mounted in the ball bearings 136, as shown, so that said casing 37 freely moves around said pivots 36 as an axis.

Through the other opening 30 in the shadow ring, see Figure 2, projects the other trunnion sleeve 33 of the vertical supporting ring 32. In fact, the common axis 38 of said pivots 36 passes through the horizontal axis 39 of the gyro wheel 40, as well as through the trunnions, or Cardan pivots 4 and 5, so that the center of gravity of the rotating wheel 40 will be at the intersection of said wheel axis 39, said axis 38, and the prolongation of said vertical pivots 13 and 15, all as will be clear from Figure 1.

In other words, the wheel itself is mounted with three degrees of freedom, one of which, about the horizontal axis, is partially suppressed by the means now to be described. Rigidly attached to the casing 37 as by the strap like means 42 is the arcuate tube 43 in which is placed a plurality of balls, a quantity of mercury, or other heavy fluid 44, the purpose of which is to weight or make pendulous the otherwise perfectly balanced wheel 40, and casing 37, thereby partially suppressing the freedom of movement about the axis 38, and causing the said wheel to orient under the influence of gravity and the earth's rotation, in the well known manner.

In other words, the addition of the tube 43 and mercury 44 lowers the center of gravity of the directive element (comprising the wheel 40 and casing 37) below the axis 38 and it will be readily apparent that any movement of the said element about the said axis 38 will carry with it the said tube 43 and mercury 44, and will raise the center of gravity of the element in the profile plane indicated by the line 50, thus producing the well known gravity couple which results in the orientation of the said element to the meridian. But on the other hand, should the directive element, together with its associated rings 32 and 20 and the main frame 6 be rocked about the pivots 9 and 10, a little consideration will make it clear that the mercury 44 will flow around in the tube 43, always seeking to maintain its lowest level. This tendency of the mercury to always occupy the lowest part of the tube 43 results in effect in a shifting of the center of gravity of the directive element relative to the rotative axis 39 whereby the said center of gravity is always maintained substantially in the plane of the line 50, or in other words, at its lowest point with respect to the pivots 9 and 10, no matter what the relative position of the directive element and its associated parts may be about the said pivots 9 and 10.

The importance of keeping the said center of gravity in the plane of the line 50, or in other words, preventing it from oscillating about the pivots 9 and 10, as above disclosed, will be more fully developed below.

In order that the operation of the invention, in so far as it has now been disclosed, may be clearly understood, it is said:—

As is well known, the casing 37 or directive element in some of the prior gyro compasses has been weighted in various ways. so as to suppress one of its degrees of freedom. But in all cases with which I am familiar, the center of gravity of the system has been so fixed that it would normally lie below the axis 38, and somewhere in the common plane of the vertical axis 50, and of the wheel axis 39.

Therefore, it follows in such a system if one of the pivots 36 should be elevated, owing to the rolling or pitching movements of the ship, the center of gravity of the directive system will be likewise elevated, and through its tendency to return at once to its lowest position, it produces torques about the vertical axis such as 50, which result in grave errors in the compass readings.

In order to make this point clear reference is had to Figures 8 to 11, of the drawings, wherein 100 diagrammatically represents the center of gravity of the directive element, pivoted on an axis 101 corresponding to axis 38, and the said axis 101 is supported in a ring 102 corresponding to vertical ring 32. The vertical pivots 103 and 104 correspond to vertical pivots 13 and 15 respectively, and the ring 105 corresponds to a portion of frame 6. The ring 108 is rigid with the ring 102, and being disposed at right angles thereto, it occupies the common plane of the axes 39 and 50.

Suppose now either end of axis 101 be elevated the weight 100 will be raised whether it occupies the plane of ring 102 or not, and it will at once seek to regain its lowest position. In practice the center of gravity of the directive element frequently finds itself, owing to the movements of the vessel, outside the common plane of axes 38 and 50, and therefore, when one of the pivots 36 is elevated a very considerable turning movement around the vertical axis 50 can be created, which unless prevented, will give rise to serious errors. That this is true will be clear from an inspection of Figure 9. Here the common plane of axes 38 and 50 is represented by the circle 102, the position of the center of gravity of the directive element is represented by the position of weight 100. Now let us elevate the end 110 of axis 101 which end we may say corresponds to pivot 36. The weight immediately takes a position outside the plane of ring 105 which involves a considerable turning movement around the vertical pivots 103 and 104. Further, at this point, it is very important to remark that, owing to the fact that the plane of ring 102 is seldom, or never at exactly right angles to the rocking movement, as is illustrated in Figures 8 and 10, even if end 110 is not elevated, substantially the same evil results are attained by the usual rocking motions of the ship unless prevented, as will be clear upon comparing the position of the parts in Figures 9 and 11 with those in Figures 8 and 10.

Now, the torque thus set up in practice around the vertical axis 50, in gyro compasses may become very annoying as well as baffling, for it is evident that a proper rhythmic motion of the vessel may catch the parts in positions favorable to produce cumulative errors of large dimensions and that therefore, it is of great importance to prevent such undesirable results.

The employment of the mercury 44 in the manner disclosed effectually avoids the above mentioned objections, for it insures that the center of gravity of the directive element cannot be raised from its lowest position by a movement about the pivots 9 and 10, and therefore, no torque around the vertical axis 50 can be generated in the manner stated. That is to say, the center of gravity of the directive element may move out of the common plane of the axes 50 and 38, and into a position corresponding to that of the weight 100 in Figure 11, but should either of the pivots 36 be raised when it is in any position at all, the mercury will always seek its lowest position without being able to generate any objectionable torque around the vertical axis 50.

As a matter of fact, the mercury 44 will always remain substantially stationary so far as movement about the pivots 9 and 10 is concerned, while the directive element and tube 43 move relatively to it about said pivots, and therefore, the center of gravity the relative position of which is dependent upon the position of the mercury, as above pointed out, will always remain in the plane indicated by the line 50, passing through the pivots 9 and 10, and the center of the earth.

Of course, in the use of the mercury tube 43, the apparent raising or depressing of the north end of the wheel axis 39, due to the earth's rotation, when the said axis is off the meridian, is not interfered with, so it follows that when the casing 37 and wheel 40 do move around the axis 38, owing to such rotation, the center of gravity may be raised in the common plane of the axes 39 and 50, as above mentioned, and there is provided the well known gravity couple, which comes into play to restore the parts, and to keep said north end pointing to the true north point.

In order to properly balance the weight of the tube 43 when empty I have further added the adjustable weights 51 and 52, one on each side of the casing, and above the horizontal axis 38. These weights are preferably located in the vertical plane of axes 39 and 50.

In the somewhat modified construction shown in Figure 4, there are two tubes 430 and 431 of mercury, which are located on each side of the casing 37 as shown. Otherwise the construction is, or may be the same as in Figures 1 and 3.

It is desirable, of course, to use a dampening device in connection with the forms of the invention shown in Figures 1 to 4, to dampen out the oscillations that take place on each side of the north point, but it is not essential to do so, and I have not illustrated any.

But, of course, any suitable dampening device may be used when desired, such for example as the pendulum 65 shown in the succeeding figures.

In the still further modified form of the invention shown in Figures 5, 6 and 7, I provide a pair of studs 139, coaxial with the shaft 39 of the wheel 40 and carried by the cover plates 140 of the casing 37, which casing as before is accurately balanced. Mounted upon each of the said studs 139 is a ball bearing 60, and depending from each of said bearings is a pendulous arm 61 which arms are connected at their lower ends as by the pendulous weight 62.

The operation of this form of the invention will be precisely similar to that of the mercury form above disclosed, in that any movement of the directive element about the axis 38 of the pivots 36, occasioned by the earth's rotation, will lift the weight 62 and raise the center of gravity of the said element in the plane indicated by the line 50, thus bringing into play the gravity couple above mentioned. But on the other hand, any rocking of the directive element and its associated parts about the pivots 9 and 10 will in no wise disturb the weight 62 which will continue to hang perpendicular to the earth's surface. The center of gravity of the said element will thus not be raised and no objectionable torque will be created about the vertical pivots 13 and 15.

As above stated, it is desirable, although not absolutely essential, to employ some means to damp out the oscillations in azimuth which are well known in this type of instrument, and to this end I have illustrated in Figures 5, 6 and 7 one form of means for doing so. It is obvious, however, that any operative form of damping means may be employed herewith, as well as with the type shown in Figures 1 and 2.

The said damping means here illustrated consists of a suitable weight 65 carried by a rod 64, which pivoted as at 63 to an annular casing member 70, housing an antifriction bearing 71, the inner race of which is mounted on a stud 72, carried by a plate 73, secured as by the screws 74 to the shadow or follow up ring 20, see Figures 5 and 6. Secured to the casing 37 at a point eccentric to the pivots 36 and below the same are the curved members 66 provided with the limiting ends or stops 67 and 68 between which the said rod 64 hangs.

It will be readily apparent that the weight 65 and its associated parts constitute a pendulum, which owing to its pivots 63 and 72 being at right angles to one another will always tend to hang perfectly vertical, or perpendicular to the earth's surface. It follows that whenever the axis 39 of the wheel 40 is apparently raised or lowered, owing to the motion of the earth as above disclosed, swinging the casing 37 about the pivots 36, the said casing will carry with it the members 66, so that one of the stops 67 or 68 will be brought into contact with the arm 64 and will tend to move the pendulum out of the vertical plane. The effort of the said pendulum to remain in the vertical plane will impress a force upon one or the other of the members 66, thereby creating a couple about both the vertical axis 50 and the horizontal axis 38, which will damp out the oscillations of the directive element in azimuth in the well known manner.

It will, of course, be understood that the parts are so proportioned that the weight of the members 66 is compensated for, i. e., the casing 37, together with the said members 66 is accurately balanced so as to be in indifferent equilibrium. Likewise the weight of the pendulum 65 and its associated parts is compensated for on the shadow ring 20, and owing to the hinge or pivot 63, which permits the weight 65 to always hang vertical, any rocking of the parts about the pivots 9 and 10 will in no wise affect the center of gravity of the system to create the objectionable torques about the vertical axis 50.

In Figure 12, I have shown a still further modified form of the invention in which the mercury tube 43, instead of being rigidly attached to the casing 37 is hung by means of the angular members 75 carrying the anti-friction bearings 76 housed in the shadow ring 20, so as to be free to oscillate about the axis 38. The said tube in this case is connected to the casing 37 by a suitable yielding or flexible connection 77 which is angularly disposed both as regards the horizontal pivots 36 and the vertical pivots 13 and 15, as shown. It will be readily apparent that in this case the action during oscillations about the Cardan pivots 9 and 10 is the same as in the preceding cases, i. e., the center of gravity of the directive element will shift as the said element rocks, and will always remain at its lowest point in the plane 50. On the other hand, any movement of the element about the pivots 36 will, through the connection 77 move the tube 43 out of its normal vertical plane, thus raising the center of gravity in the plane 50 and bringing into play the gravity couple to cause the wheel to orient. At the same time, owing to the angular disposition of the said connection 77, a couple will be produced about the vertical pivots 13 and 15, which will tend to damp out the oscillations of the element in azimuth, as above explained.

It will now be clear that in all the forms, although there exists a center of gravity which may oscillate around the horizontal axis 38, yet, should either end of said axis be raised through the rolling and pitching movements of the ship, no component around the vertical axis 50 is created by said center of gravity.

It is obvious that those skilled in the art may vary the details of the construction as well as the arrangement of parts, without departing from the spirit of the invention, and therefore, I do not wish to be limited to the above disclosure except as may be required by the claims.

What I claim is:—

1. In a gyro compass the combination of a directive element; a supporting means for mounting said element for oscillation around a horizontal axis; means for mounting said supporting means for movement about a vertical axis; and a movable mass of mercury associated with said directive element, the center of gravity of which is maintained in its lowest position when either end of said horizontal axis is tipped, substantially as described.

2. In a gyroscopic compass having a directive element, the combination of a weight comprising a mass of mercury, a spinning axis, a horizontal axis, and a vertical axis each disposed at a substantial angle to the other; and means for so supporting said weight from said directive element that when said element is moved about said horizontal axis, in one direction, said weight will exert a force to move said element in an opposite direction, and when said horizontal axis is tipped said weight will remain in its lowest position, substantially as described.

3. In a gyro compass, the combination of a support; a gyroscopic directive element having a spinning axis, mounted in said support for movement about substantially horizontal and vertical axes; and a single means carried by said directive element, adapted to suppress movement thereof about said horizontal axis, and also adapted to move substantially around said spinning axis when said horizontal axis is tipped to maintain the center of gravity of said directive element at its lowest point, substantially as described.

In testimony whereof I affix my signature, in presence of two witnesses.

GEORGE A. ROSSITER.

Witnesses:
 CHAS. H. PEARCE,
 ALICE ELLFILLAR.